(12) United States Patent
Nagasawa

(10) Patent No.: US 9,125,177 B2
(45) Date of Patent: Sep. 1, 2015

(54) RADIO COMMUNICATION SYSTEM, RADIO BASE STATION, RADIO TERMINAL, AND COMMUNICATION CONTROL METHOD

(75) Inventor: Chizuko Nagasawa, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/112,725

(22) PCT Filed: Apr. 6, 2012

(86) PCT No.: PCT/JP2012/059539
§ 371 (c)(1),
(2), (4) Date: Oct. 18, 2013

(87) PCT Pub. No.: WO2012/144353
PCT Pub. Date: Oct. 26, 2012

(65) Prior Publication Data
US 2014/0030999 A1 Jan. 30, 2014

(30) Foreign Application Priority Data

Apr. 21, 2011 (JP) .................................. 2011-095519

(51) Int. Cl.
*H04W 76/00* (2009.01)
*H04W 24/04* (2009.01)
*H04W 36/00* (2009.01)

(52) U.S. Cl.
CPC ............ *H04W 76/007* (2013.01); *H04W 24/04* (2013.01); *H04W 36/0066* (2013.01)

(58) Field of Classification Search
CPC .......................... H04W 36/0066; H04W 24/04
USPC ............. 455/404.1, 404.2, 436; 370/331, 332
See application file for complete search history.

(56) References Cited

U.S. PATENT DOCUMENTS

| 6,192,232 | B1 * | 2/2001 | Iseyama ...................... 455/404.1 |
| 2010/0124901 | A1 * | 5/2010 | Shi et al. ..................... 455/404.2 |
| 2012/0195261 | A1 | 8/2012 | Nishida et al. |
| 2013/0235846 | A1 | 9/2013 | Nishida et al. |

FOREIGN PATENT DOCUMENTS

| JP | 2009-111603 A | 5/2009 |
| JP | 2011-061248 A | 3/2011 |

OTHER PUBLICATIONS

3GPP TS 36.300 V9.4.0 (Jun. 2010) Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9).
International Search Report for PCT/JP2012/059539 mailed Jul. 3, 2012.
Written Opinion for PCT/JP2012/059539 mailed Jul. 3, 2012.

* cited by examiner

*Primary Examiner* — Phuoc H Doan
(74) *Attorney, Agent, or Firm* — Studebaker & Brackett PC

(57) ABSTRACT

A radio communication system includes a first radio base station corresponding to a first radio communication scheme and a second radio base station corresponding to a second radio communication scheme. The first radio base station transmits a first switching request notification for requesting switching of a connection to the second radio base station to a radio terminal connected to the first radio base station when emergency information associated with an emergency situation from an upper network has been received. The radio terminal transmits, to the second radio base station, a connection request notification for requesting a connection to the second radio base station when the first switching request notification has been received.

3 Claims, 8 Drawing Sheets

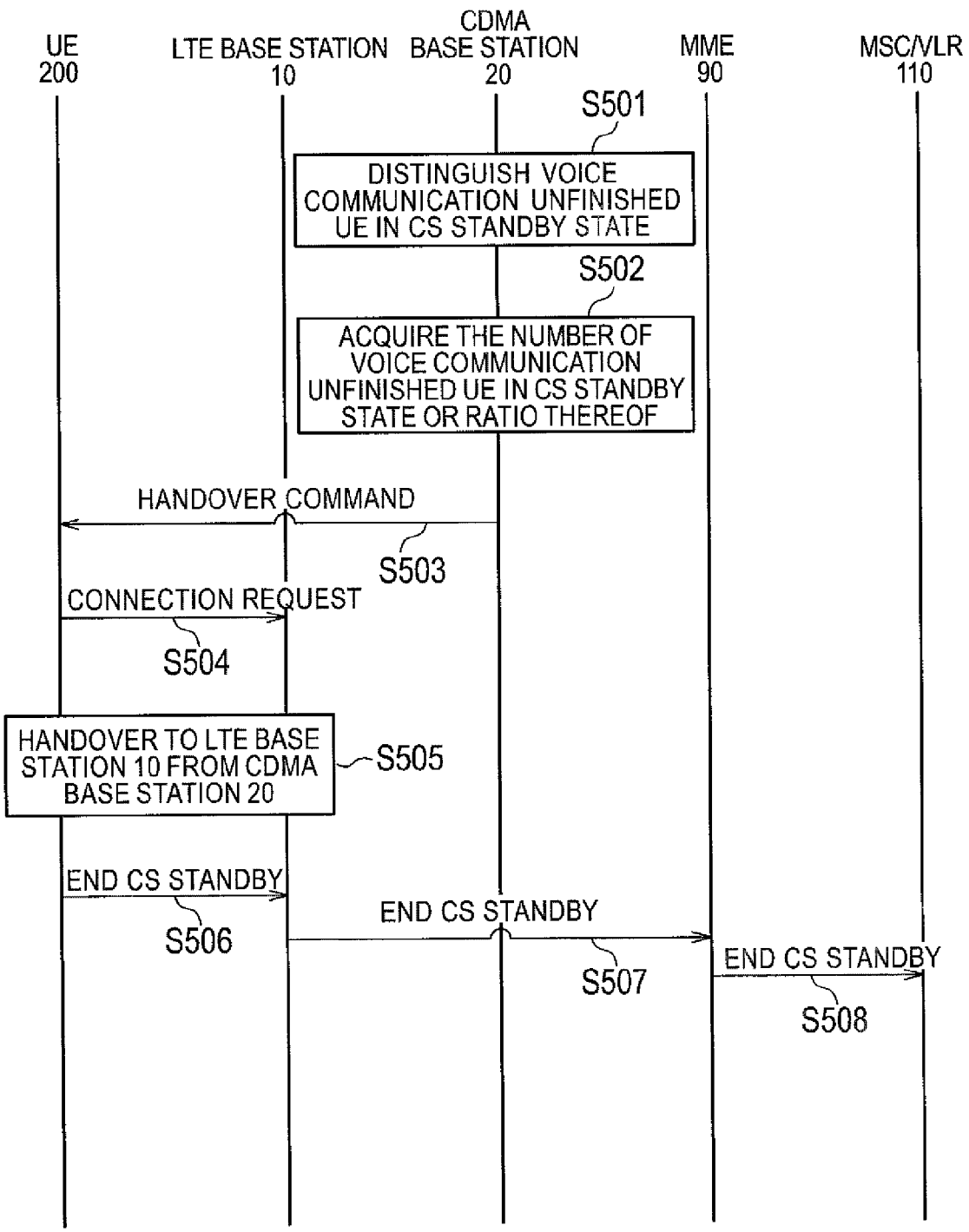

RADIO COMMUNICATION SYSTEM, RADIO BASE STATION, RADIO TERMINAL, AND COMMUNICATION CONTROL METHOD

TECHNICAL FIELD

The present invention relates to a radio communication system including a first system corresponding to a first radio communication scheme and a second system corresponding to a second radio communication scheme, a radio base station and a radio terminal in the radio communication system, and a communication control method in the radio communication system.

BACKGROUND ART

In 3GPP (Third Generation Partnership Project), according to a radio communication system corresponding to LTE (Long Term Evolution), standards of which are being currently designed, a radio base station is connected to MME (Mobile Management Entity) that is an upper node via a backhaul and performs communication with the MME.

In the same manner, according to a radio communication system corresponding to CDMA (Code Division Multiple Access), a radio base station is connected to MSC/VLR (Mobile Switching Center/Visitor Location Register) that is an upper node via a backhaul and performs communication with the MSC/VLR.

A radio communication system corresponding to the LTE and the CDMA uses a technology of CS-Fallback at the time of a voice communication service when the LTE has no VoIP (Voice over IP) function. In the CS-Fallback, a radio terminal connected to a radio base station (an LTE base station) corresponding to the LTE switches a connection to a radio base station (a CDMA base station) corresponding to the CDMA and starts voice communication.

In a radio communication system using the CS-Fallback, a radio terminal always connects to the LTE base station. For this reason, the radio terminal performs the transmission of a call-issuance request or the reception of a call-up at the time of a call arrival via the LTE base station in voice communication. Then, the radio terminal performs handover that switches a connection from the LTE base station to the CDMA base station. After the handover, the radio terminal performs the transmission of a call-issuance request or the reception of a call-up at the time of a call arrival via the CDMA base station, and starts the voice telephone communication.

At the time of a disaster such as an earthquake, it is expected that many persons perform voice communication for the purpose of safety confirmation, a call for help and the like. For this reason, since there is an increase in various processes such as handover in the CS-Fallback, it is expected to reach a state in which congestion easily occurs.

Furthermore, in the radio communication system using the CS-Fallback, the radio terminal needs to be connectable to both the LTE base station and the CDMA base station. However, at the time of a disaster, it is probable that there occurs an obstacle such as a fault of a radio base station or cutting of a backhaul line. Particularly, in the case in which an obstacle occurs in the LTE base station, even when the CDMA base station normally operates, the radio terminal is not able to perform the voice communication.

PRIOR ART DOCUMENT

Non-Patent Document

[Non-Patent Document 1]: 3GPP TS 36.300 V9.4.0 (2010-06)

SUMMARY OF THE INVENTION

An aspect of the present invention is summarized as a radio communication system (a radio communication system 1), which includes a first radio base station (an LTE base station 10) corresponding to a first radio communication scheme (LTE) and a second radio base station (a CDMA base station 20) corresponding to a second radio communication scheme (CDMA), wherein the first radio base station transmits a first switching request notification (a handover command for switching a connection destination from the LTE base station 10 to the CDMA base station 20) for requesting switching of a connection to the second radio base station to a radio terminal (an UE 200) connected to the first radio base station when emergency information (an ETWS information) associated with an emergency situation has been received, and the radio terminal transmits, to the second radio base station, a connection request notification (a connection request message) for requesting a connection to the second radio base station when the first switching request notification has been received.

In such a radio communication system, when the first radio base station has received the emergency information, it is probable that the radio terminal connected to the first radio base station is not able to perform radio communication due to a fault of the first radio base station or cutting of a backhaul line for connecting the first radio base station to an upper device, for example, by a disaster after the reception of the emergency information. For this reason, when the emergency information has been received, the first radio base station requests the radio terminal connected to the first radio base station to perform switching of a connection to the second radio base station, and the radio terminal transmits, to the second radio base station, a connection request to the second radio base station in response to the switching request. In this way, before a fault occurs in the first radio base station or an obstacle related to the first radio base station occurs, the radio terminal is able to switch a connection destination to the second radio base station in advance, so that it is possible to improve the reliability of radio communication.

An aspect of the present invention is summarized as the second radio base station transmits a second switching request notification (a handover command for switching a connection destination from the CDMA base station 20 to the LTE base station 10) for requesting switching of a connection to the first radio base station to a radio terminal performing no voice communication from among a plurality of radio terminals having switched a connection to the second radio base station An aspect of the present invention is summarized as the second radio base station transmits the second switching request notification in response to the number of radio terminals that perform voice communication.

An aspect of the present invention is summarized as the second radio base station transmits the second switching request notification in response to a ratio of radio terminals that perform the voice communication.

An aspect of the present invention is summarized as the radio terminal transmits, to the first radio base station, a first reconnection request (a connection request message) notification for requesting a connection to the first radio base station after the radio terminal connects to the second radio base station and a first predetermined time lapses.

An aspect of the present invention is summarized as the radio terminal transmits a second reconnection request notification for requesting a connection to the first radio base station after the radio terminal connects to the second radio base station to perform voice communication and a second predetermined time lapses.

An aspect of the present invention is summarized as the first radio base station transmits the first switching request notification to a plurality of radio terminals connected to the first radio base station at different timings.

An aspect of the present invention is summarized as a radio base station in a system, which corresponds to a predetermined radio communication scheme, wherein when emergency information associated with an emergency situation has been received, the radio base station transmits a switching request notification to a radio terminal connected to the radio base station, the switching request notification requesting switching of a connection to another radio base station in a system corresponding to another radio communication scheme.

An aspect of the present invention is summarized as a radio terminal, which is able to connect a first radio base station corresponding to a first radio communication scheme and a second radio base station corresponding to a second radio communication scheme, wherein when a switching request notification for requesting switching of a connection to the second radio base station has been received from the first radio base station, the radio terminal transmits, to the second radio base station, a connection request notification for requesting a connection to the second radio base station.

An aspect of the present invention is summarized as a communication control method in a radio communication system, which includes a first radio base station corresponding to a first radio communication scheme and a second radio base station corresponding to a second radio communication scheme, comprising: a step of transmitting, by the first radio base station, a switching request notification for requesting switching of a connection to the second radio base station to a radio terminal connected to the first radio base station when emergency information associated with an emergency situation has been received; and a step of transmitting, by the radio terminal, a connection request notification to the second radio base station when the switching request notification has been received, the connection request notification requesting a connection to the second radio base station.

BRIEF DESCRIPTION OF THE DRAWINGS

FIG. 9 is a sequence diagram illustrating a fifth operation of the radio communication system according to the embodiment of the present invention.

DESCRIPTION OF THE EMBODIMENT

Figure 1:
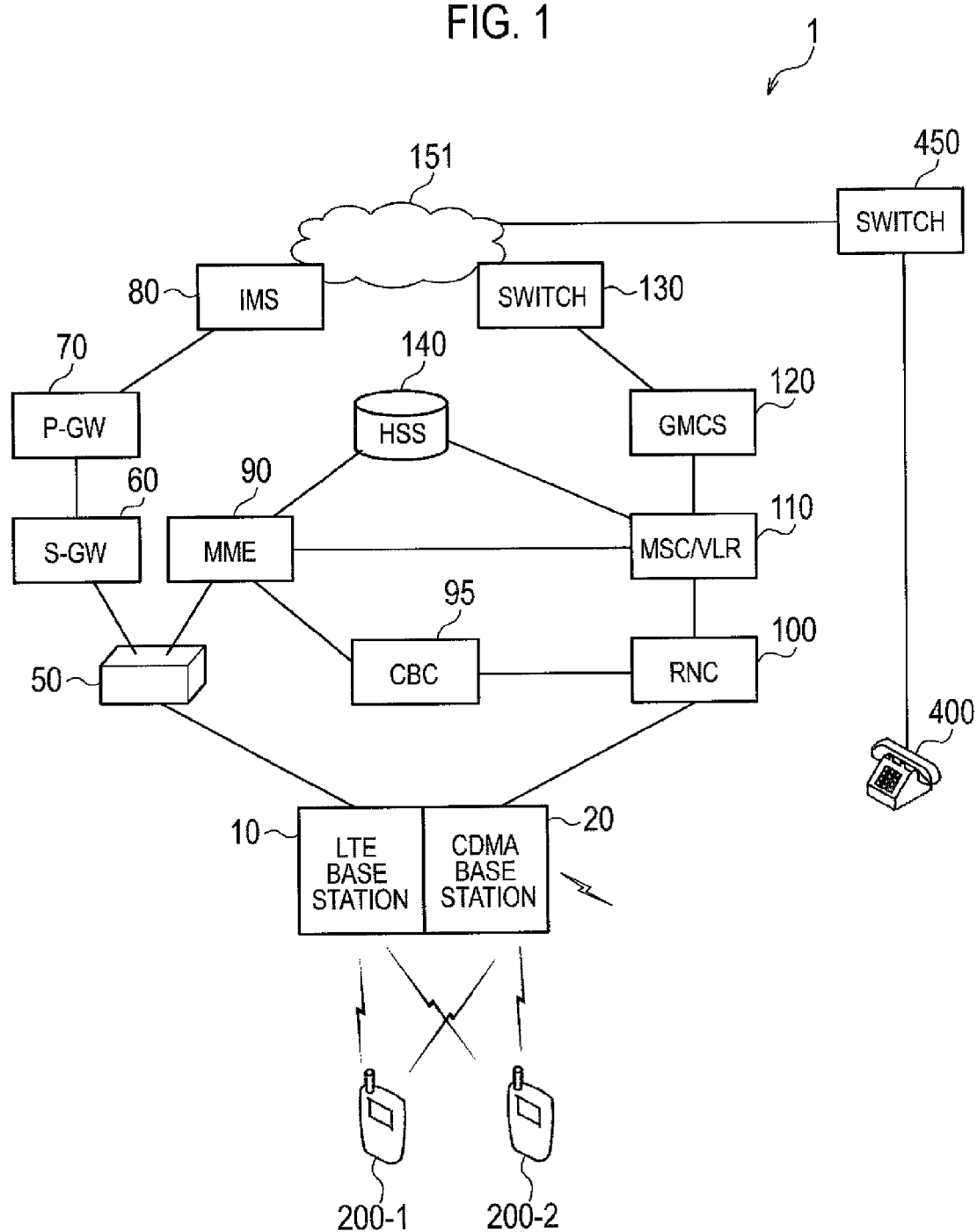
FIG. 1 is a diagram illustrating the entire schematic configuration of a radio communication system according to an embodiment of the present invention.

Next, an embodiment of the present invention will be described with reference to the drawings. Specifically, a configuration of a radio communication system, an operation of the radio communication system, an operation and an effect, and other embodiments will be described. In all drawings for explaining the following embodiments, the same or similar reference numerals are used to designate the same or similar elements.

(1) Configuration of Radio Communication System

FIG. 1 is a diagram showing the schematic configuration of a radio communication system according to the present embodiment. A radio communication system 1 illustrated in FIG. 1 includes a radio communication system corresponding to LTE and a radio communication system corresponding to CDMA.

The radio communication system 1 enables voice communication between radio terminals (UE: User Equipment) 200-1 and UE 200-2 (hereinafter, UE 200-1 and UE 200-2 will be collectively appropriately referred to as "UE 200") and a terminal device 400 connected to an external switch 450.

In the present embodiment, the radio communication system corresponding to the LTE is a radio communication system for data communication, which has no VoIP (Voice over IP) function. The radio communication system corresponding to the LTE includes an LTE base station 10, a router 50, S-GW (Serving Gateway) 60, P-GW (Packet data network Gateway) 70, IMS (IP Multimedia Subsystem) 80, and MME (Mobile Management Entity) 90. The router 50, the S-GW 60, the P-GW 70, the IMS 80, and the MME 90 are installed at a backhaul (LTE backhaul) in a radio communication system corresponding to LTE.

The radio communication system corresponding to the LTE has a function of an earthquake and tsunami warning system (ETWS) that is one of a public warning system (PWS). The ETWS indicates a system that notifies the UE 200 of emergency information on an earthquake and a tsunami by using a broadcast channel of the radio communication system corresponding to the LTE.

In the present embodiment, a radio communication system corresponding to CDMA indicates a radio communication system for voice communication. The radio communication system corresponding to the CDMA includes a CDMA base station 20, RNC (Radio Network Controller) 100, MSC/VLR (Mobile Switching Center/Visitor Location Register) 110, GMCS (Generalized Multi Carrier Subsystem) 120, and a switch 130. The RNC 100, the MSC/VLR 110, the GMCS 120, and the switch 130 are installed in a backhaul (a CDMA backhaul) in the radio communication system corresponding to the CDMA.

Furthermore, the radio communication system 1 includes HSS (Home Subscriber Server) 140 and CBC 95, which are commonly used in the radio communication system corresponding to the LTE and the radio communication system corresponding to the CDMA, and a network 151 that connects the radio communication system corresponding to the LTE to the radio communication system corresponding to the CDMA. The LTE base station 10 and the CDMA base station 20 are installed in the same location.

In the present embodiment, the UE 200 exists in a cell of the LTE base station 10 and a cell of the CDMA base station 20, and is able to perform radio communication with both of the LTE base station 10 and the CDMA base station.

(1.1) Configuration of LTE Base Station

Figure 2:
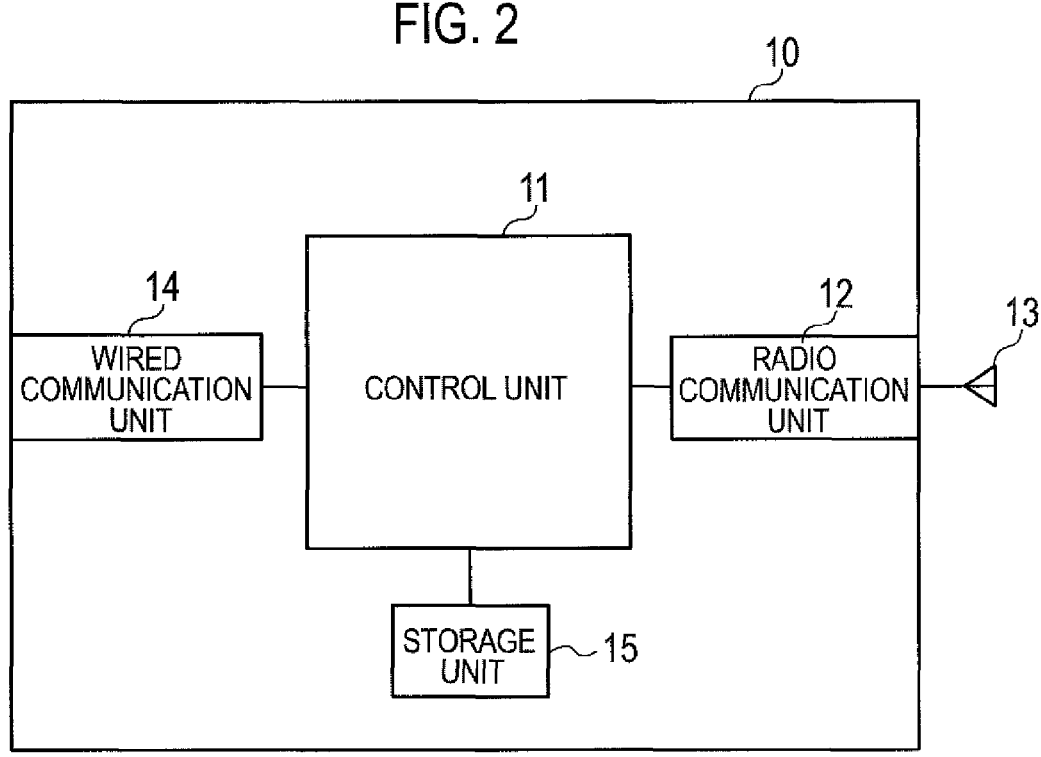
FIG. 2 is a configuration diagram of an LTE base station according to the embodiment of the present invention.

FIG. 2 is a diagram illustrating the configuration of the LTE base station 10. As illustrated in FIG. 2, the LTE base station 10 includes a control unit 11, a radio communication unit 12, an antenna 13, a wired communication unit 14, and a storage unit 15.

The control unit 11 is configured by using a CPU (Central Processing Unit) and a DSP (Digital Signal Processor), for example. The control unit 11 controls various functions provided in the LTE base station 10.

The radio communication unit 12 is configured by using a radio frequency (RF) circuit and a baseband (BB) circuit, for example. The radio communication unit 12 is able to perform radio communication with the UE 200 via the antenna 13. The wired communication unit 14 performs communication with the router 50 that is an upper node. The storage unit 15 is configured by using a memory, for example, and stores various types of information that is used for control and the like of the LTE base station 10.

(1.2) Configuration of CDMA Base Station

Figure 3:
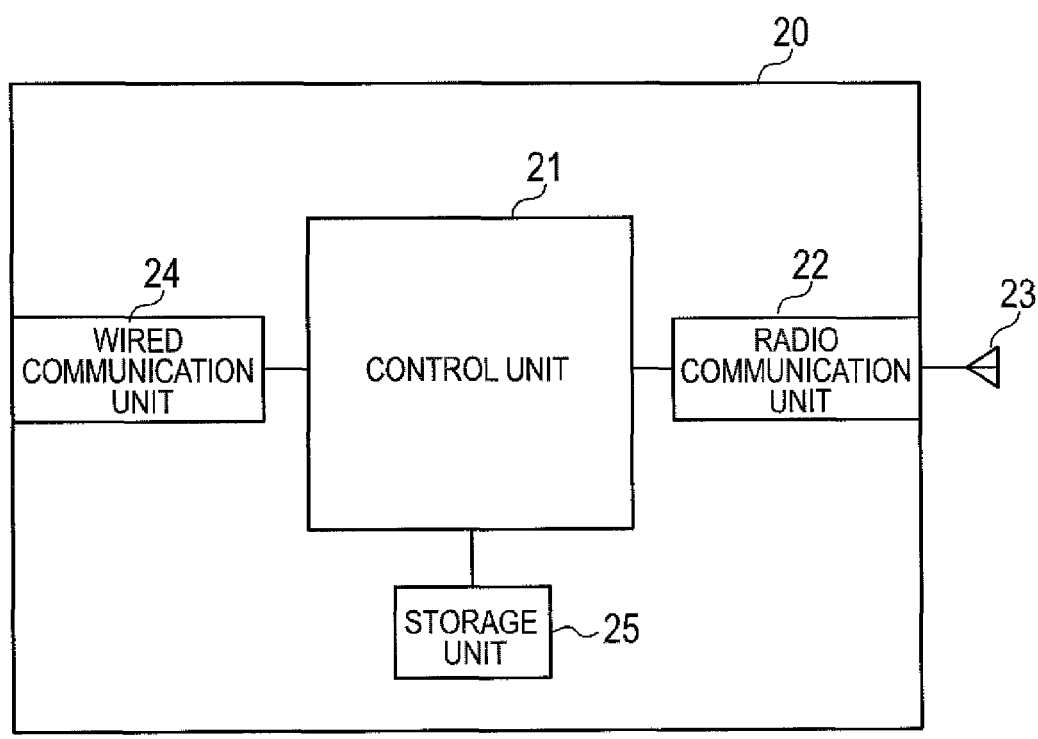
FIG. 3 is a configuration diagram of a CDMA base station according to the embodiment of the present invention.

FIG. 3 is a diagram illustrating the configuration of the CDMA base station 20. As illustrated in FIG. 3, the CDMA base station 20 includes a control unit 21, a radio communication unit 22, an antenna 23, a wired communication unit 24, and a storage unit 25.

The control unit 21 is configured by using a CPU and a DSP, for example. The control unit 21 controls various functions provided in the CDMA base station 20.

The radio communication unit 22 is configured by using an RF circuit and a BB circuit, for example. The radio communication unit 22 is able to perform radio communication with the UE 200 via the antenna 23. The wired communication unit 24 performs communication with the RNC 100 that is an upper node. The storage unit 25 is configured by using a memory, for example, and stores various types of information that is used for control and the like of the CDMA base station 20.

(1.3) Configuration of UE

Figure 4:
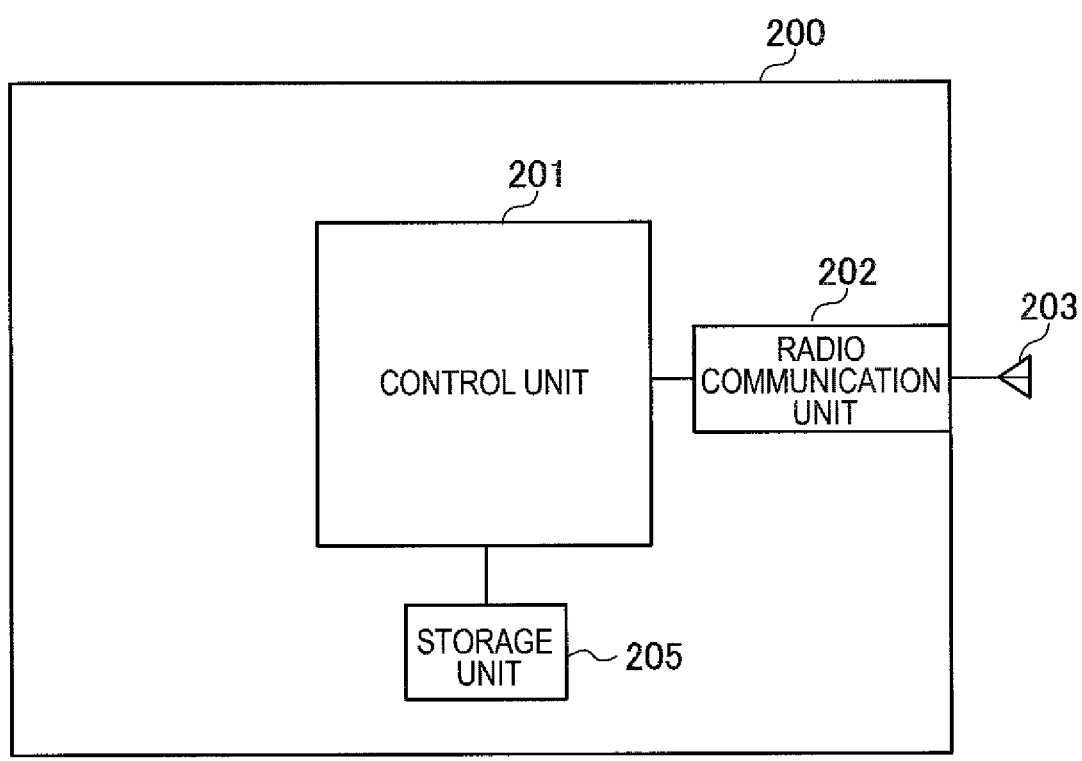
FIG. 4 is a configuration diagram of UE according to the embodiment of the present invention.

FIG. 4 is a diagram illustrating the configuration of the UE 200. As illustrated in FIG. 4, the UE 200 includes a control unit 201, a radio communication unit 202, an antenna 203, and a storage unit 205.

The control unit 201 is configured by using a CPU and a DSP, for example. The control unit 201 controls various functions provided in the UE 200.

The radio communication unit 202 is configured by using an RF circuit and a BB circuit, for example. The radio communication unit 202 is able to perform radio communication with the LTE base station 10 and the CDMA base station 20 via the antenna 203. The storage unit 205 is configured by using a memory, for example, and stores various types of information that is used for control and the like of the UE 200.

The radio communication system 1 uses a CS-fallback technology at the time of voice communication by the UE 200. In this way, the UE 200 connected to the LTE base station 10 switches a connection to the CDMA base station 20 and starts the voice communication.

Hereinafter, a description will be provided for detailed processes (a first process to a fourth process) when the CS-fallback is performed.

(First Process)

An ETWS issuing terminal device (not illustrated) transmits earthquake and tsunami warning (ETWS) information, which indicates information associated with a predetermined emergency situation to an ETWS information server (not illustrated) when it is expected that an earthquake or a tsunami occurs. The ETWS information, for example, includes information on the expected size of shaking of an earthquake or information on the expected height of a tsunami.

The ETWS information server receives the ETWS information. Moreover, the ETWS information server transmits the ETWS information to the MME 90. The MME 90 receives the ETWS information. Moreover, the MME 90 transmits the ETWS information to the LTE base station 10 via the router 50.

The control unit 11 of the LTE base station 10 receives the ETWS information via the wired communication unit 14. The control unit 11 of the LTE base station 10 analyzes the scale of a disaster indicated by the ETWS information. When the scale of the disaster is equal to or more than a predetermined scale (for example, when the size of shaking of an expected earthquake is equal to or more than a predetermined value, or when the height of an expected tsunami is equal to or more than a predetermined value), the control unit 11 of the LTE base station 10 transmits a message (a CS standby start instruction message) for instructing the start of a standby in the CS-Fallback to UE 200 connected to the LTE base station 10 via the radio communication unit 12 and the antenna 13. The standby in the CS-Fallback indicates that the UE 200 enters a standby state in voice communication by connecting to the CDMA base station 20 when the UE 20 becomes a call-arrival side of the voice communication, and by connecting to the CDMA base station 20 in order to receive a simultaneous calling message from the CDMA base station 20 when the UE 20 becomes a call-arrival side of the voice communication.

The control unit 201 of the UE 200 receives the CS standby start instruction message via the antenna 203 and the radio communication unit 202. The control unit 201 of the UE 200 and the control unit 11 of the LTE base station perform a process (Optional Measurement Report Solicitation) of determining a CDMA base station 20 serving as the connection destination of the UE 200 at the time of standby in the CS-Fallback.

Specifically, the control unit 201 of the UE 200 receives a signal (a broadcast signal) from a neighboring CDMA base station 20 via the antenna 203 and the radio communication unit 202. The broadcast signal includes identification information of a CDMA base station 20 that is a transmission source. The control unit 201 of the UE 200 measures a reception level (a received electric field intensity) of the received broadcast signal. The control unit 201 of the UE 200 determines a CDMA base station 20, which is a transmission source of the broadcast signal having a reception level equal to or more than a predetermined value, as a candidate of the connection destination of the UE 200 at the time of standby in the CS-Fallback. The control unit 201 of the UE 200 transmits identification information of the CDMA base station 20, which is the candidate of the connection destination of the UE 200 at the time of standby in the CS-Fallback, to the LTE base station 10 as measurement report information via the radio communication unit 202 and the antenna 203.

The control unit 11 of the LTE base station 10 receives the measurement report information. On the basis of the measurement report information, the control unit 11 of the LTE base station 10 determines the CDMA base station 20 serving as the connection destination of the UE 200 at the time of standby in the CS-Fallback.

The control unit 11 of the LTE base station 10 transmits a handover command to the UE 200 via the radio communication unit 12 and the antenna 13. The handover command indicates a commend for instructing handover to the CDMA base station 20 determined as the connection destination of the UE 200 at the time of standby in the CS-Fallback. The handover command includes identification information of the CDMA base station 20 serving as the connection destination. Furthermore, when a plurality of UEs 200 exist in a cell formed by the LTE base station 10 and the control unit 11 of the LTE base station 10 determines a CDMA base station 20 serving as a connection destination for each UE 200, the control unit 11 of the LTE base station 10 transmits the handover command to each UE 200 at different timings.

The control unit 201 of the UE 200 receives the handover command via the antenna 203 and the radio communication unit 202. On the basis of the handover command, the control unit 201 of the UE 200 identifies the CDMA base station 20 serving as the connection destination. The control unit 201 of the UE 200 transmits a message for requesting to connect to the CDMA base station 20 via the radio communication unit 202 and the antenna 203. The connection request message indicates a message that is used when the UE 200 requests a connection for the CDMA base station 20.

The control unit 21 of the CDMA base station 20 receives the connection request message via the antenna 23 and the radio communication unit 22. The control unit 21 of the CDMA base station 20 performs a process of connecting the UE 200. The process of connecting the UE 200 indicates a process, in which the control unit 21 of the CDMA base station 20 assigns a radio channel to the UE 200, and the like. Through the connection process, handover to the CDMA base station 20 from the LTE base station 10 is performed.

After the handover is ended, the control unit 201 of the UE 200 transmits a CS standby start message to the CDMA base station 20 via the radio communication unit 202 and the antenna 203. The CS standby start message indicates a message for notifying that standby in the CS-Fallback starts. For example, the CS standby start message includes identification information of the UE 200 that is a transmission source.

The control unit 21 of the CDMA base station 20 receives the CS standby start message via the antenna 23 and the radio communication unit 22. Moreover, the control unit 21 of the CDMA base station 20 transmits the CS standby start message to the MSC/VLR 110 serving as an upper node via the wired communication unit 24 and the RNC 100.

In addition, when the UE 200 has performed the handover in the CDMA system, specifically, when the connection destination of the UE 200 has been switched from the CDMA base station 20 to another CDMA base station 20, the MSC/VLR 110 transmits the CS standby start message to another MSC/VLR 110 including the other CDMA base station 20 serving as a switching destination as a lower node.

The MSC/VLR 110 manages the location of the UE 200 in units of predetermined ranges (Location Areas) in the CDMA system. The Location Area indicates an area of a cell formed by one or a plurality of CDMA base stations 20 serving as a lower node. For example, the MSC/VLR 110 holds identification information of the Location Area and identification information of UE 200 existing in the Location Area by associating them with each other. The MSC/VLR 110 receives the CS standby start message. Through the CS standby start message, the MSC/VLR 110 is able to recognize that the UE 200 serving as a transmission source of the CS standby start message has entered a standby state in the CS-Fallback, and has become a location management object. Moreover, the MSC/VLR 110 transmits the CS standby start message to the MME 90.

The MME 90 manages the location of the UE 200 in units of predetermined ranges (Tracking Areas) in the LTE system. The Tracking Area indicates an area of a cell formed by one or a plurality of LTE base stations 10. For example, the MME 90 holds identification information of the Tracking Area and identification information of UE 200 existing in the Tracking Area by associating them with each other. The MME 90 receives the CS standby start message. Through the CS standby start message, the MME 90 is able to recognize that the UE 200 serving as a transmission source of the CS standby start message has entered a standby state in the CS-Fallback, and has become out of a location management object.

(Second Process)

The second process indicates a process that is performed after the UE 200 connects to the CDMA base station 20 and then enters a standby state in the voice communication through the aforementioned first process, and indicates a process at the time of a call arrival for the UE 200.

The MSC/VLR 110 receives a call-arrival request message from the GMCS 120 that is an upper node. The call-arrival request message indicates a message for requesting a call arrival for the UE 200 in voice communication in which the terminal device 400 serves as a call-issuance side and the UE 200 serves as a call-arrival side. The call-arrival request message includes identification information of UE 200 serving as a call-arrival destination.

The MSC/VLR 110 designates a combination including the identification information of UE 200 included in the call-arrival request message from among combinations of the held identification information of UE 200 and the identification information of Location Area. Moreover, the MSC/VLR 110 distinguishes that Location Area which corresponds to the identification information of the Location Area included in the designated combination is the Location Area where the UE 200 serving as a call-arrival destination exists. Next, the MSC/VLR 110 transmits a simultaneous calling message to a CDMA base station 20 corresponding to the distinguished Location Area via the RNC 100. The simultaneous calling message indicates a message for calling up the UE 200 serving as a call-arrival destination. The simultaneous calling message includes identification information of the UE 200 serving as a call-arrival destination.

The control unit 21 of the CDMA base station 20 receives the simultaneous calling message via the wired communication unit 24. The control unit 21 of the CDMA base station 20 receives the simultaneous calling message via the radio communication unit 22 and the antenna 23.

The control unit 201 of the UE 200 receives the simultaneous calling message via the antenna 203 and the radio communication unit 202. When the identification information of the UE 200 included in the simultaneous calling message indicates the identification information of the UE 200, the control unit 201 of the UE 200 receives a simultaneous calling response message to the CDMA base station 20 serving as the transmission source of the simultaneous calling message via the radio communication unit 202 and the antenna 203. The simultaneous calling response message indicates a message that is a response of the simultaneous calling message.

The control unit 21 of the CDMA base station 20 receives the simultaneous calling response message via the antenna 23 and the radio communication unit 22. The control unit 21 of the CDMA base station 20 transmits the simultaneous calling response message to the MSC/VLR 110 via the wired communication unit 24 and the RNC 100. The MSC/VLR 110 receives the simultaneous calling response message. Through the reception of the simultaneous calling response message, the MSC/VLR 110 is able to recognize that a call has been arrived in the UE 200. Then, between the UE 200 and the terminal device 400, voice communication via the CDMA base station 20 is performed.

(Third Process)

The third process indicates a process that is performed after the UE 200 connects to the CDMA base station 20 and then enters a standby state in the voice communication through the aforementioned first process, and indicates a process at the time of call issuance by the UE 200.

The control unit 201 of the UE 200 transmits a voice call-issuance request message via the radio communication unit 202 and the antenna 203. The voice call-issuance request message indicates a message for requesting voice communication between the UE 200 and the terminal device 400. The voice call-issuance request message includes identification information of the terminal device 400 serving as a call-arrival destination.

The control unit 21 of the CDMA base station 20 receives the voice call-issuance request message via the antenna 23 and the radio communication unit 22. The control unit 21 of the CDMA base station 20 transmits the voice call-issuance request message to the MSC/VLR 110 via the wired communication unit 24 and the RNC 100. The MSC/VLR 110 receives the voice call-issuance request message and transmits it to the GMCS 120 that is an upper node. Then, between the UE 200 and the terminal device 400, voice communication via the CDMA base station 20 is performed.

(Fourth Process)

The fourth process indicates a process that is performed after the UE 200 connects to the CDMA base station 20 and then enters a standby state in the voice communication through the aforementioned first process.

The control unit 201 of the UE 200 measures a passage time after the UE 200 switches a connection destination from the LTE base station 10 to the CDMA base station 20, or a passage time after voice communication performed by the UE 200 connected to the CDMA base station 20 is ended.

When the passage time has lapsed a predetermined time, the control unit 201 of the UE 200 transmits a connection request message to the LTE base station 10 via the radio communication unit 202 and the antenna 203. The connection request message indicates a message that is used when the UE 200 requests a connection to the LTE base station 10.

The control unit 11 of the LTE base station 10 receives the connection request message via the antenna 13 and the radio communication unit 12. The control unit 11 of the LTE base station 10 performs a process of connecting the UE 200. The process of connecting the UE 200 indicates a process, in which the control unit 11 of the LTE base station 10 assigns a radio channel to the UE 200, and the like. Through the connection process, handover to the LTE base station 10 from the CDMA base station 20 is performed.

After the handover is ended, the control unit 201 of the UE 200 transmits a CS standby end message to the LTE base station 10 via the radio communication unit 202 and the antenna 203. The CS standby end message indicates a message for notifying that standby in the CS-Fallback is ended. For example, the CS standby start message includes identification information of the UE 200 that is a transmission source.

The control unit 11 of the LTE base station 10 receives the CS standby end message via the antenna 13 and the radio communication unit 12. Moreover, the control unit 11 of the LTE base station 10 transmits the CS standby end message to the MME 90 serving as an upper node via the wired communication unit 14 and the router 50.

The MME 90 receives the CS standby end message and transmits it to the MSC/VLR 110. The MSC/VLR 110 receives the CS standby end message. Through the CS standby end message, the MSC/VLR 110 is able to recognize that the UE 200 serving as a transmission source of the CS standby end message has become out of a location management object.

(Fifth Process)

The fifth process indicates a process that is performed after the UE 200 connects to the CDMA base station 20 and then enters a standby state in the voice communication through the aforementioned first process.

The control unit 21 of the CDMA base station 20 manages UEs 200 (UEs 200 in a CS standby state), which performs handover to the CDMA base station 20 from the LTE base station 10 and enters a standby state in the CS-Fallback, from among UEs 200 connected to the CDMA base station 20. For example, when the CS standby start message has been received, the control unit 21 of the CDMA base station 20 is able to determine that UE 200 serving as a transmission source of the CS standby start message is the UE 200 in a CS standby state.

The control unit 21 of the CDMA base station 20 distinguishes UE 200 in a CS standby state, in which voice communication is not finished, from among the UEs 200 in a CS standby state. Furthermore, the control unit 21 of the CDMA base station 20 may distinguish only UE 200 in a CS standby state, which performs voice communication at the time of the determination, or may also distinguish UE 200 in a CS standby state that has performed no voice communication in a predetermined period in the past. Furthermore, the control unit 21 of the CDMA base station 20 may also distinguish UE 200 in a CS standby state that never has performed the voice communication after connecting to the CDMA base station 20.

The control unit 21 of the CDMA base station 20 acquires the number of UEs 200 in a CS standby state (voice communication unfinished UEs 200 in a standby state), in which voice communication is not finished, from among the UEs 200 in a CS standby state. Alternatively, the control unit 21 of the CDMA base station 20 calculates a ratio (a voice communication unfinished ratio) of voice communication unfinished UEs 200 in a CS standby state, with respect to the number of the UEs 200 in a CS standby state.

When the number of the voice communication unfinished UEs 200 in a CS standby state is equal to or more than a predetermined number, or when the voice communication unfinished ratio is equal to or more than a predetermined value, the control unit 21 of the CDMA base station 20 transmits a handover command to the voice communication unfinished UEs 200 in a CS standby state via the radio communication unit 22 and the antenna 23. The handover command indicates a command for instructing handover to the LTE base station 10. The handover command includes identification information of the LTE base station 10 serving as a connection destination.

The control unit 201 of the UE 200 receives the handover command via the antenna 203 and the radio communication unit 202. On the basis of the handover command, the control unit 201 of the UE 200 recognizes the LTE base station 10 serving as a connection destination. The control unit 201 of the UE 200 transmits a message for requesting to connect to the LTE base station 10 via the radio communication unit 202 and the antenna 203. The connection request message indicates a message that is used when the UE 200 requests a connection for the LTE base station 10.

The control unit 11 of the LTE base station 10 receives the connection request message via the antenna 13 and the radio communication unit 12. The control unit 11 of the LTE base station 10 performs a process of connecting the UE 200. The process of connecting the UE 200 indicates a process, in which the control unit 11 of the LTE base station 10 assigns a radio channel to the UE 200, and the like. Through the connection process, handover to the LTE base station 10 from the CDMA base station 20 is performed.

After the handover is ended, the control unit 201 of the UE 200 transmits a CS standby end message to the LTE base station 10 via the radio communication unit 202 and the antenna 203. The CS standby end message indicates a message for notifying that standby in the CS-Fallback is ended. For example, the CS standby start message includes identification information of the UE 200 that is a transmission source.

The control unit 11 of the LTE base station 10 receives the CS standby end message via the antenna 13 and the radio communication unit 12. Moreover, the control unit 11 of the LTE base station 10 transmits the CS standby end message to the MME 90 serving as an upper node via the wired communication unit 14 and the router 50.

The MME 90 receives the CS standby end message and transmits it to the MSC/VLR 110. The MSC/VLR 110 receives the CS standby end message. Through the CS standby end message, the MSC/VLR 110 is able to recognize that the UE 200 serving as a transmission source of the CS standby end message has become out of a location management object.

(2) Operation of Radio Communication System

Figure 5:
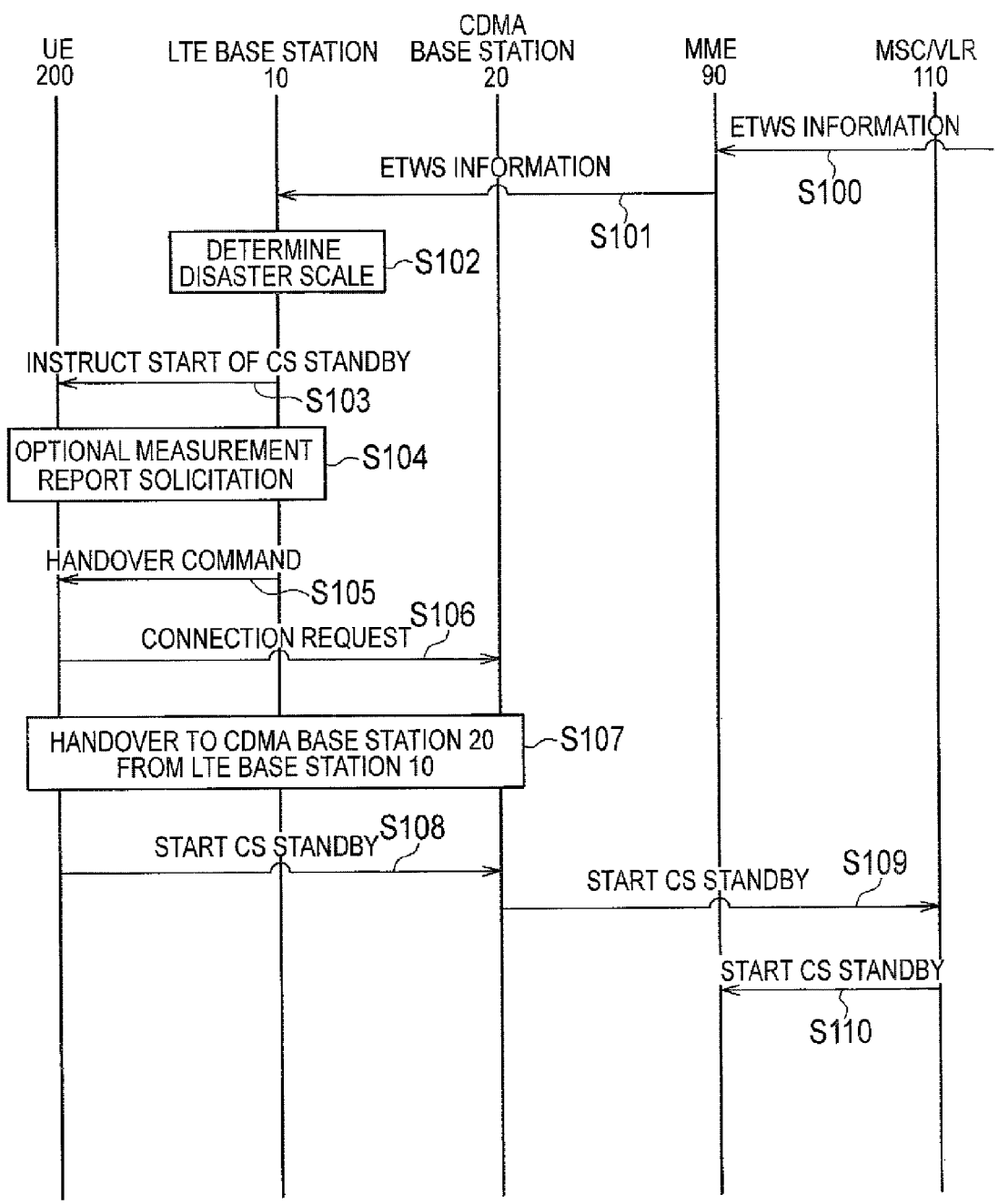
FIG. 5 is a sequence diagram illustrating a first operation of the radio communication system according to the embodiment of the present invention.

FIG. 5 is a sequence diagram illustrating a first operation of the radio communication system 1. The first operation corresponds to the aforementioned first process.

In step S100, the MME 90 receives ETWS information. In step S101, the MME 90 transmits the ETWS information. The LTE base station 10 receives the ETWS information.

In step S102, the LTE base station 10 determines the scale of a disaster on the basis of the ETWS information. When the scale of the disaster is equal to or more than a predetermined scale, the LTE base station 10 transmits a CS standby start instruction message in step S103. UE 200 connected to the LTE base station 10 receives the CS standby start instruction message.

In step S104, the UE 200 and the LTE base station perform a process (Optional Measurement Report Solicitation) of determining a CDMA base station 20 serving as a connection destination of the UE 200 at the time of standby in CS-Fallback.

In step S105, the LTE base station 10 transmits a handover command. The UE 200 receives the handover command. In step S106, the UE 200 transmits a connection request message. The CDMA base station 20 receives the connection request message.

In step S107, the CDMA base station 20 and the UE 200 perform a handover process of switching the connection destination of the UE 200 from the LTE base station 10 to the CDMA base station 20.

In step S108, the UE 200 transmits a CS standby start message. The CDMA base station 20 receives the CS standby start message. In step S109, the CDMA base station 20 transmits the CS standby start message. The MSC/VLR 110 receives the CS standby start message. In step S110, the MSC/VLR 110 transmits the CS standby start message. The MME 90 receives the CS standby start message.

Figure 6:
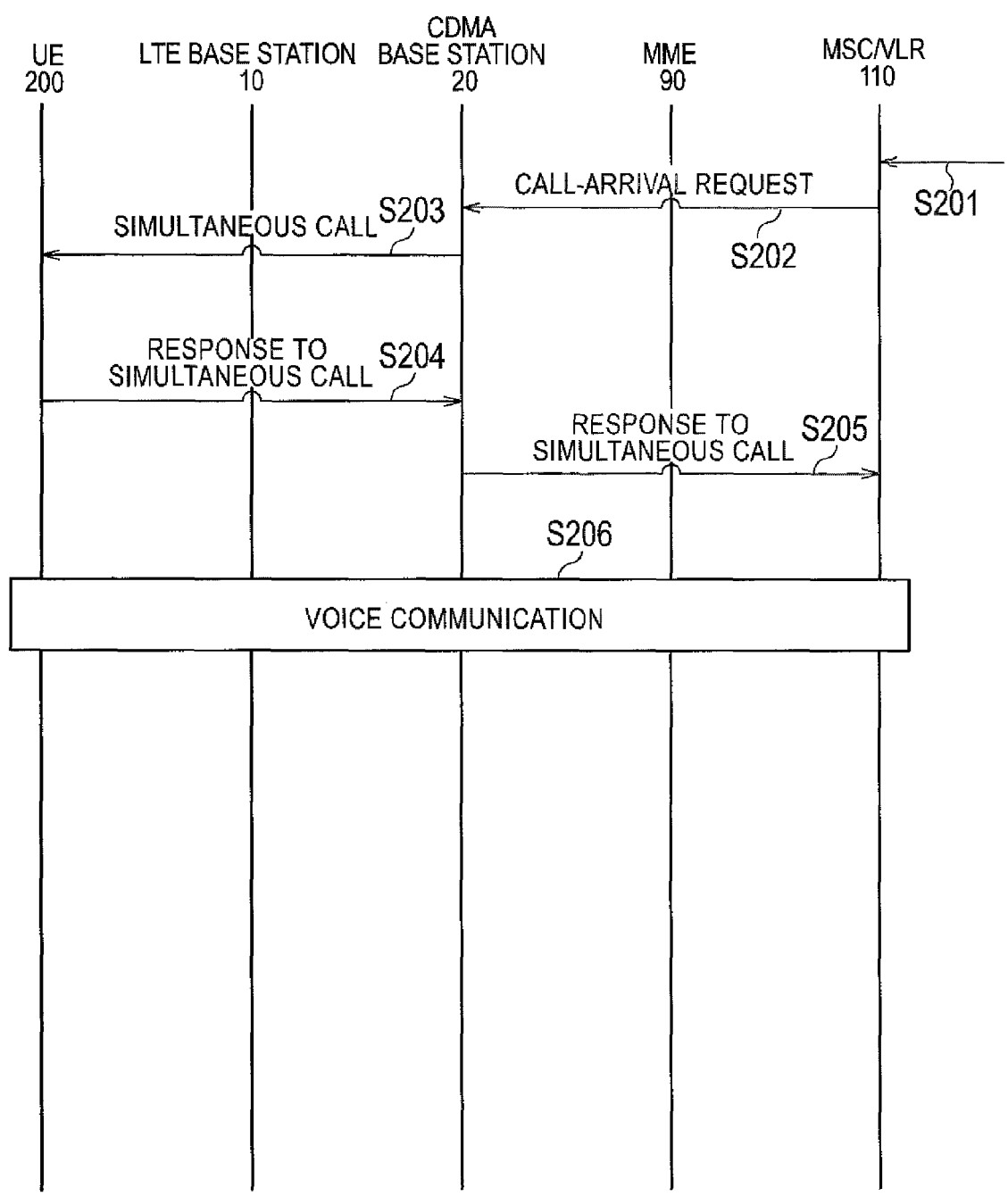
FIG. 6 is a sequence diagram illustrating a second operation of the radio communication system according to the embodiment of the present invention.

FIG. 6 is a sequence diagram illustrating a second operation of the radio communication system 1. The second operation corresponds to the aforementioned second process.

In step S201, the MSC/VLR 110 receives a call-arrival request message. In step S202, the MSC/VLR 110 transmits a simultaneous calling message. The CDMA base station 20 receives the simultaneous calling message.

In step S203, the CDMA base station 20 transmits the simultaneous calling message. The UE 200 receives the simultaneous calling message. In step S204, the UE 200 transmits a simultaneous calling response message. The CDMA base station 20 receives the simultaneous calling response message. In step S205, the CDMA base station 20 transmits the simultaneous calling response message. The MSC/VLR 110 receives the simultaneous calling response message.

In step S206, the UE 200 and the terminal device 400 perform voice communication via the CDMA base station 20.

Figure 7:
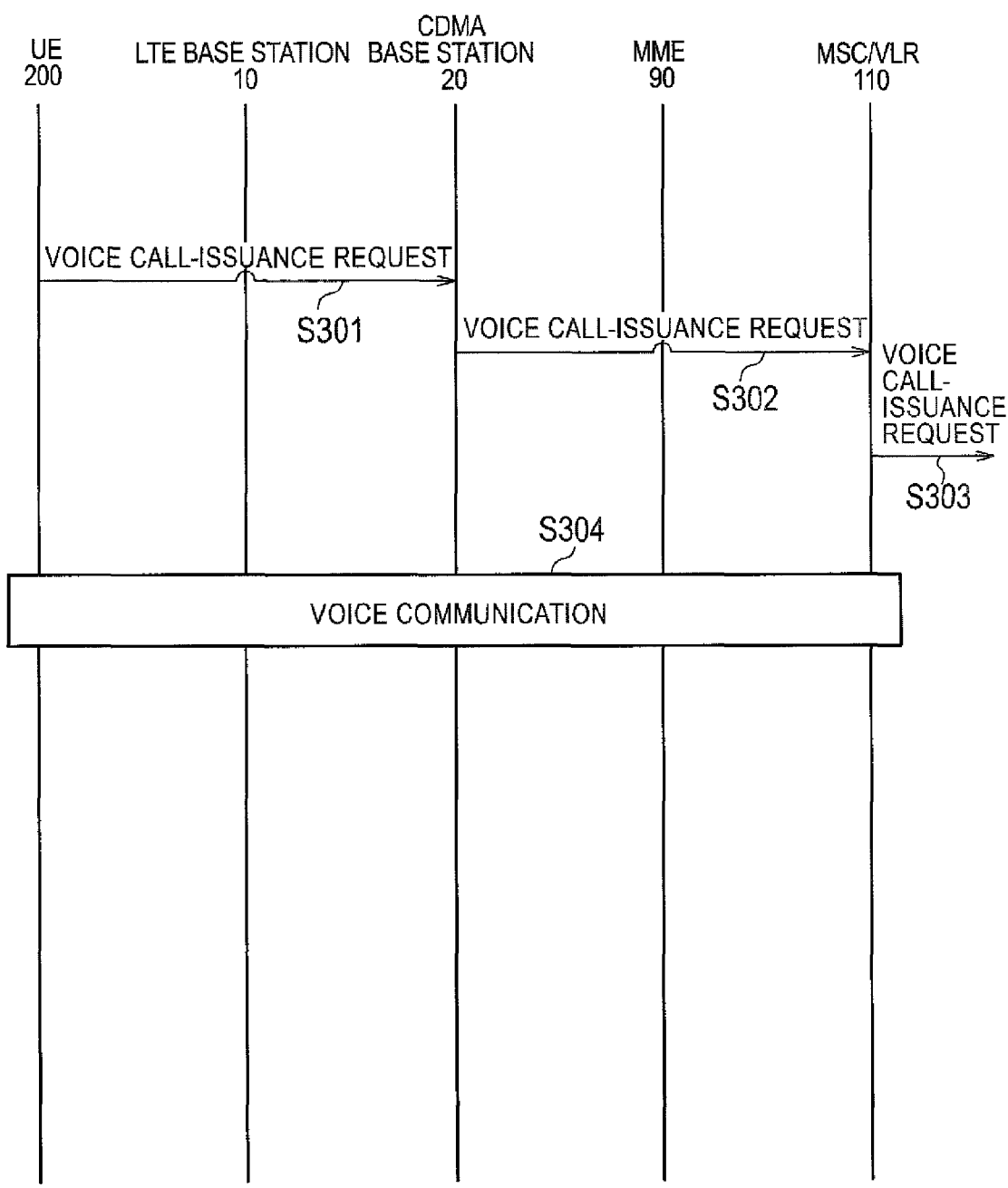
FIG. 7 is a sequence diagram illustrating a third operation of the radio communication system according to the embodiment of the present invention.

FIG. 7 is a sequence diagram illustrating a third operation of the radio communication system 1. The third operation corresponds to the aforementioned third process.

In step S301, the UE 200 transmits a voice call-issuance request message. The CDMA base station 20 receives the voice call-issuance request message. In step S302, the CDMA base station 20 transmits the voice call-issuance request message. The MSC/VLR 110 receives the voice call-issuance request message. In step S303, the MSC/VLR 110 transmits the voice call-issuance request message.

In step S304, the UE 200 and the terminal device 400 perform voice communication via the CDMA base station 20.

Figure 8:
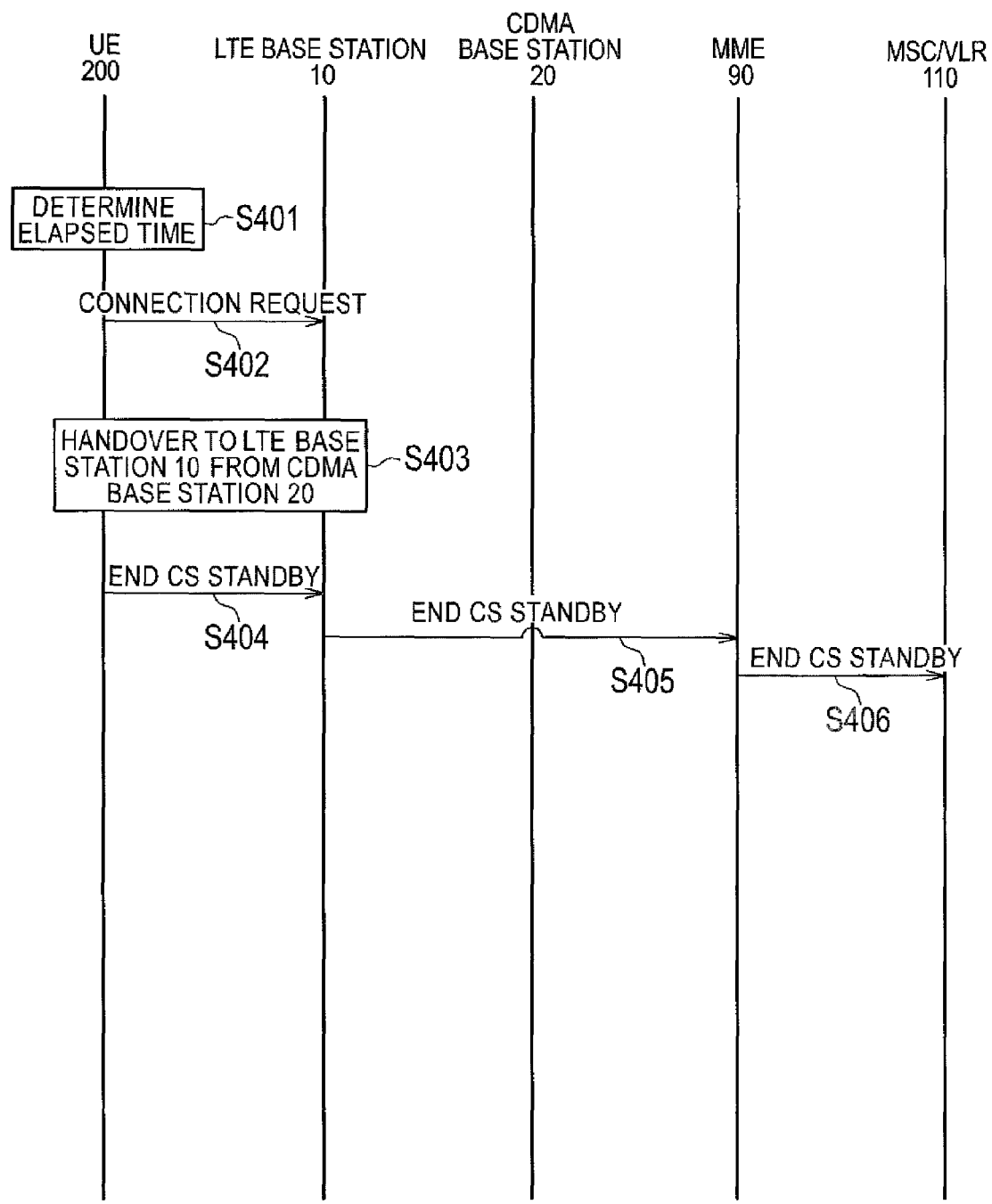
FIG. 8 is a sequence diagram illustrating a fourth operation of the radio communication system according to the embodiment of the present invention.

FIG. 8 is a sequence diagram illustrating a fourth operation of the radio communication system 1. The fourth operation corresponds to the aforementioned fourth process.

In step S401, the UE 200 determines whether a passage time after the UE 200 connects to the CDMA base station 20, or a passage time after voice communication performed by the UE 200 connected to the CDMA base station 20 is ended, has lapsed a predetermined time.

When the passage time has lapsed the predetermined time, the UE 200 transmits a connection request message in step S402. The LTE base station 10 receives the connection request message.

In step S403, the LTE base station 10 and the UE 200 perform a handover process of switching the connection destination of the UE 200 from the CDMA base station 20 to the LTE base station 10.

In step S404, the UE 200 transmits a CS standby end message. The LTE base station 10 receives the CS standby end message. In step S405, the LTE base station transmits the CS standby end message. The MME 90 receives the CS standby end message. In step S406, the MME 90 transmits the CS standby end message. The MSC/VLR 110 receives the CS standby end message.

FIG. 9 is a sequence diagram illustrating a fifth operation of the radio communication system 1. The fifth operation corresponds to the aforementioned fifth process.

In step S501, the CDMA base station 20 distinguishes voice communication unfinished UEs 200 in a CS standby state. In step S502, the CDMA base station 20 acquires the number or a ratio of the voice communication unfinished UEs 200 in a CS standby state.

When the number of the voice communication unfinished UEs 200 in a CS standby state is equal to or more than a predetermined number, or when the ratio of the voice communication unfinished UEs 200 in a CS standby state is equal to or more than a predetermined value, the CDMA base station 20 transmits a handover command in step S503. The UE 200 receives the handover command.

In step S504, the UE 200 transmits a connection request message. The LTE base station 10 receives the connection request message.

In step S505, the LTE base station 10 and the UE 200 perform a handover process of switching the connection destination of the UE 200 from the CDMA base station 20 to the LTE base station 10.

In step S506, the UE 200 transmits a CS standby end message. The LTE base station 10 receives the CS standby end message. In step S507, the LTE base station transmits the CS standby end message. The MME 90 receives the CS standby end message. In step S508, the MME 90 transmits the CS standby end message. The MSC/VLR 110 receives the CS standby end message.

(3) Operation and Effect

In the radio communication system 1 according to the present embodiment, when the LTE base station 10 has received the ETWS information, it is probable that the LTE base station 10 is not able to perform radio communication due to a fault of the LTE base station 10 or cutting of a backhaul line for connecting the LTE base station 10 to an upper node, for example, by a disaster after the reception of the ETWS information.

For this reason, when the ETWS information has been received, the LTE base station 10 transmits a handover command to UE 200 connected to the LTE base station 10, wherein the handover command indicates a request for switching a connection to the CDMA base station 20. On the basis of the received handover command, the UE 200 transmits, to the CDMA base station 20, a connection request message for requesting a connection to the CDMA base station 20. In this way, before an obstacle related to the LTE base station 10 occurs, the UE 200 is able to switch a connection destination to the CDMA base station 20 in advance, thereby entering a standby state in the CS-Fallback. Consequently, it is possible to improve the reliability of voice radio communication of the UE 200.

Furthermore, when a plurality of UEs 200 are connected to the LTE base station 10, the LTE base station 10 transmits a handover command to each UE 200 at different timings. In this way, since each UE 200 receives the handover command at different timings, timings of handover process to the CDMA base station 20 from the LTE base station 10 are also different from one another. Consequently, a process related to handover in the LTE base station 10 serving as a handover source and the CDMA base station 20 serving as a handover destination is prevented from being concentrating in a short time, resulting in the reduction of the load of the process.

Furthermore, when a passage time after the connection destination of the UE 200 is switched from the LTE base station 10 to the CDMA base station 20, or a passage time after voice communication performed by the UE 200 connected to the CDMA base station 20 is ended, has lapsed a predetermined time, the UE 200 transmits a connection request message to the LTE base station 10. Then, a process is performed to return the connection destination of the UE 200 to the LTE base station 10 from the CDMA base station 20.

It is expected that the frequency of voice communication is high immediately after a disaster corresponding to the ETWS information occurs, and then is gradually reduced according to the passage of time. For this reason, after a predetermined time lapses, the connection destination of the UE 200 is returned to the LTE base station 10 from the CDMA base station 20, so that the UE 200 is able to select a base station that is a connection destination corresponding to the usage state of a user.

Furthermore, after the connection destination of the UE 200 is switched from the LTE base station 10 to the CDMA base station 20, when the number of the voice communication unfinished UEs 200 in a CS standby state is equal to or more than a predetermined number, or when the ratio of the voice communication unfinished UEs 200 in a CS standby state is equal to or more than a predetermined value, the CDMA base station 20 transmits a handover command to the voice communication unfinished UEs 200 in a CS standby state. Then, a process is performed to return the connection destination of the UE 200 to the LTE base station 10 from the CDMA base station 20.

Even immediately after a disaster corresponding to the ETWS information occurs, UE 200 (voice communication unfinished UE 200 in a CS standby state), in which voice communication is not performed, is less likely to perform the voice communication thereafter. For this reason, the connection destination of the voice communication unfinished UE 200 in a CS standby state is returned to the LTE base station 10 from the CDMA base station 20, so that the UE 200 is able to select a base station that is a connection destination corresponding to the usage state of a user.

(4) Other Embodiments

As described above, the present invention has been described with the embodiment. However, it should not be understood that those descriptions and drawings constituting a part of the present disclosure limit the present invention. From this disclosure, a variety of alternate embodiments, examples, and applicable techniques will become apparent to one skilled in the art.

In the aforementioned embodiment, when the ETWS information has been received, the LTE base station 10 transmits a handover command to UE 200, thereby allowing the connection destination of the UE 200 to be switched from the LTE base station 10 to the CDMA base station 20. However, even when information on PWS has been received other than the ETWS information, the LTE base station 10 may transmit the handover command to UE 200.

Furthermore, after handover to the CDMA base station 20, when a predetermined time for handover to the LTE base station 10 has not lapsed, if a message for requesting handover to the LTE base station 10 has been received from the UE 200, the handover to the LTE base station 10 may also be performed.

In this way, during the handover of the UE 200 to the CDMA base station 20, when a user of the UE 200 desires for data communication, it is probable that it is possible to perform communication via the LTE base station 10.

Furthermore, in the aforementioned embodiment, the radio communication system 1 includes a radio communication system corresponding to LTE and a radio communication system corresponding to CDMA. However, the present invention can be applied in the same manner to the radio communication system 1 including radio communication systems corresponding to other radio communication schemes.

Thus, it should be understood that the present invention includes various embodiments that are not described herein. Therefore, the present invention is limited only by the specific features of the invention in the scope of the claims reasonably evident from the disclosure above.

In addition, the entire content of Japanese Patent Application No. 2011-095519 (filed on Apr. 21, 2011) is incorporated in the present specification by reference.

INDUSTRIAL APPLICABILITY

According to the present invention, it is possible to improve the reliability of radio communication performed by a radio terminal.

The invention claimed is:

1. A radio base station in a system, which corresponds to a predetermined radio communication scheme, wherein
when emergency information associated with an emergency situation has been received, the radio base station transmits a switching request notification to a radio terminal connected to the radio base station, and the switching request notification to a plurality of radio terminals connected to the radio base station at different timings, the switching request notification requesting switching of a connection to another radio base station in a system corresponding to another radio communication scheme.

2. A radio terminal, which is able to connect a first radio base station corresponding to a first radio communication scheme and a second radio base station corresponding to a second radio communication scheme, wherein
when a switching request notification for requesting switching of a connection to the second radio base station has been received from the first radio base station, the radio terminal transmits, to the second radio base station, a connection request notification for requesting a connection to the second radio base station, and
the radio terminal transmits, to the first radio base station, a first reconnection request notification for requesting a connection to the first radio base station after the radio terminal connects to the second radio base station and a first predetermined time lapses.

3. A communication control method in a radio communication system, which includes a first radio base station corresponding to a first radio communication scheme and a second radio base station corresponding to a second radio communication scheme, comprising:
a step of transmitting, by the first radio base station, a switching request notification for requesting switching of a connection to the second radio base station to a radio terminal connected to the first radio base station and the first switching request notification to a plurality of radio terminals connected to the first radio base station at different timings when emergency information associated with an emergency situation has been received; and
a step of transmitting, by the radio terminal, a connection request notification to the second radio base station when the switching request notification has been received, the connection request notification requesting a connection to the second radio base station.

* * * * *